United States Patent [19]

Haugwitz

[11] Patent Number: 4,619,535
[45] Date of Patent: Oct. 28, 1986

[54] BEARING HOUSING
[75] Inventor: Werner Haugwitz, Schweinfurt, Fed. Rep. of Germany
[73] Assignee: SKF Gmbh, Schweinfurt, Schweinfurt, Fed. Rep. of Germany
[21] Appl. No.: 704,389
[22] Filed: Feb. 22, 1985
[30] Foreign Application Priority Data
Feb. 25, 1984 [DE] Fed. Rep. of Germany ....... 3406963
[51] Int. Cl.⁴ .................... F16C 33/66; F16C 35/00
[52] U.S. Cl. .................................. 384/472; 384/406; 384/583
[58] Field of Search .................... 384/403–406, 384/462, 472, 473, 475, 519, 555, 583; 308/85 R, 85 A

[56] References Cited
U.S. PATENT DOCUMENTS

| 1,908,379 | 5/1933 | Todd | 384/406 |
| 2,360,737 | 10/1944 | Steinmann | 308/85 R |
| 2,445,432 | 7/1948 | Hodell | 384/406 |
| 3,149,890 | 9/1964 | Selby | 384/473 |
| 3,497,274 | 2/1970 | Yardley | 384/583 |
| 4,533,264 | 8/1985 | Haugwitz | 384/406 X |

Primary Examiner—Stuart S. Levy
Assistant Examiner—David Werner
Attorney, Agent, or Firm—Eugene E. Renz, Jr.

[57] ABSTRACT

A pillow block housing having partition means dividing the interior of the housing into an outer oil reservoir chamber and an inner chamber for a rolling bearing, said chambers being separated by partition means extending in a generally radial direction with respect to the bearing axis, a lubricator ring which rests in the inner chamber on a shaft member or the like and projects through recesses in the housing partitions into the oil reservoir chamber and supplies lubricant from the reservoir to the inner bearing chamber upon rotation of the shaft, said partition means comprising separate divider sections selectively adjustable in various axial positions in the housing bore in a form-locking manner.

11 Claims, 1 Drawing Figure

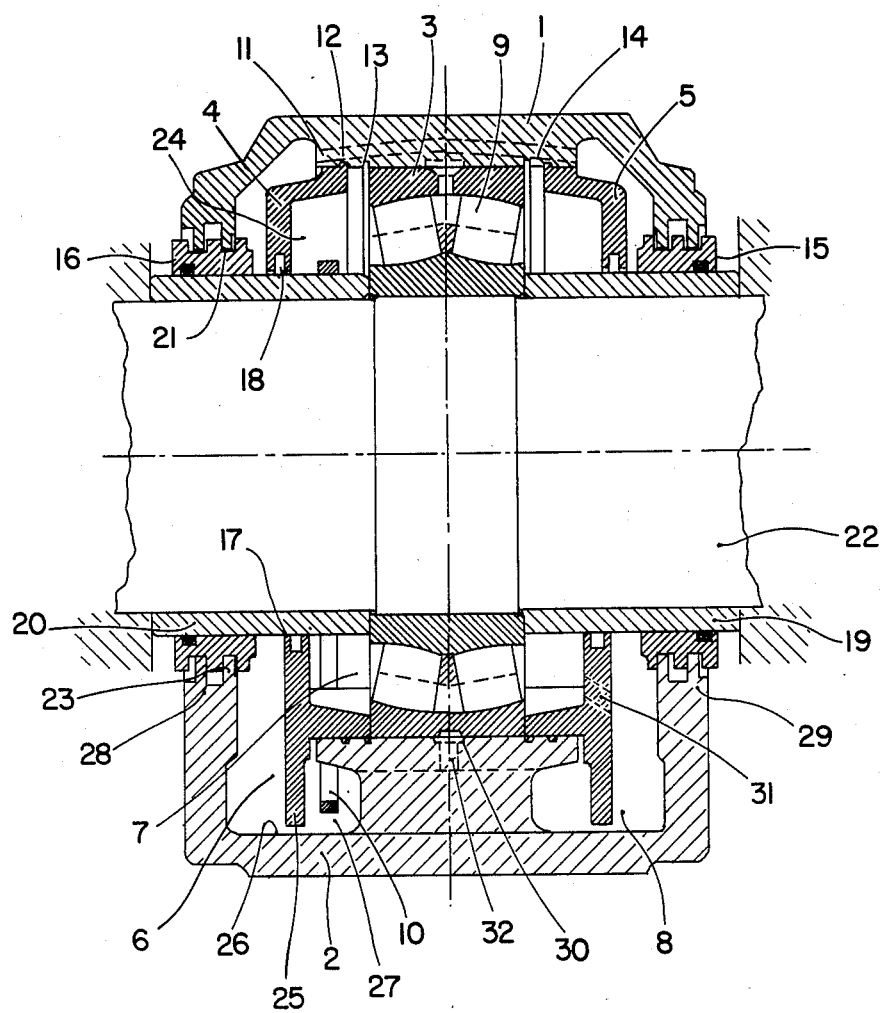

BEARING HOUSING

FIELD OF THE INVENTION

The present invention relates to bearing housings and more specifically to a two-part housing having a series of internally radially extending walls or partitions deviding the interior of the housing into an inner chamber for a rolling bearing and a separate oil reservoir chamber and including a lubricator ring which rests in the inner chamber on a shaft member or the like and projects through recesses in the housing into the oil reservoir to supply lubricant from the reservoir into the inner bearing chamber upon rotation of the shaft.

BACKGROUND OF THE INVENTION

Housings of the above described type are not new per se. For example, French Pat. No. 1,424,461 shows a housing having partition means. In accordance with this known design, the partition which separates two chambers is in the form of a cover connected to the housing by suitable screw-type fasteners. It has been found that the manufacture and assembly of this housing is rather complicated and costly. Furthermore, disassembly of the housing parts in order to permit inspection of the bearing is rather complicated and time-consuming. An additional disadvantage of this known design is that tight and loose bearing configurations require differently designed housing parts.

SUMMARY OF THE INVENTION

With the foregoing in mind, it is an object of the present invention to provide a multi-purpose bearing housing which is rather easy and ecomomical to produce with regard to casting and fabrication considerations, which may be effectively used for both tight and loose bearing designs and wherein bearings of various width series and different sealing rings, even of different diameters, can be used without the need to alter the dimensions of the housing.

To this end, the housing of the present invention includes partition means comprising a separate divider which can be fixed axially in various positions in the housing bore in a form-locking manner. The divider is preferably cup-shaped and has on its lateral surface a cylindrical section and a radially outwardly directed rib which engages in an annular groove in the bore of the housing. By this arrangement, it is possible to divide the interior space of the housing rather easily into an inner bearing chamber and an outer chamber which serves as a lubricant reservoir and as a so-called "calming" chamber for the lubricating oil which has been agitated in the inner bearing chamber.

In accordance with a specific feature of the present invention, two or more annular grooves may be provided in the housing bore adjacent the bearing and spaced apart a predetermined axial distance. By this arrangement, the distance between the divider and the outer ring of the rolling bearing can be selectively varied so that the bearing can be installed either as a loose or as a tight bearing. Additionally, by reason of this arrangement, the housing can accommodate bearings of different width or different diameter series which can be assembled without difficulty.

In accordance with still another feature of the present invention, a second divider is provided in the housing on the side of the rolling bearing opposite the lubricator ring. This divider has a lubricant overflow port thereby ensuring that the lubricant level in the inner bearing chamber is independent of the lubricant level in the lubricant reservoir and also providing for flow of oil from the lubricator ring side through the bearing.

In accordance with still another feature of the present invention, the height of the lubricant level and the circulation of the lubricant are regulated by ports or holes in the outer ring of the bearing by a combination including ports or holes in the outer ring of the bearing, an annular groove in the outer ring or housing and a radial port leading to the oil reservoir.

In accordance with still a further feature of the invention, the outer housing chambers formed by the dividers on either side of the bearing chamber, that is the chambers which serve to calm the lubricant are connected to each other by a common air channel to equalize the pressure in the two chambers.

BRIEF DESCRIPTION OF THE DRAWING

These and other objects of the present invention and the various features and details of the operation and construction thereof are hereinafter more fully set forth with reference to the accompanying drawing, wherein:

FIG. 1 is a transfer sectional view of a bearing housing in accordance with the present invention wherein the upper half shows the parts arranged in a manner to provide a loose bearing fit and the lower half of the drawing illustrates the parts arranged to provide a tight bearing fit.

DESCRIPTION OF THE PREFERRED EMBODIMENT

Referring to the drawing, the housing illustrated is a pillow block housing comprising broadly an upper section and a lower section which are secured by suitable screw fasteners or the like (not shown). The housing sections define a bore 3. The interior of the housing is divided into a series of chambers by a pair of dividers 4, 5 which are of cup-shaped configuration and divide the housing into three interior chambers 6, 7, 8. The two outer chambers 6 and 8 serve as reservoirs for the lubricating oil and act as so-called rest zones. As illustrated the outer chambers 6 and 8 are connected to one another by an appropriate air conduit or channel 14 so that even when there are different pressure conditions on opposing sides of the housing, the pressure can stabilize and equalize by reason of the connecting channel 14.

As illustrated the dividers 4, 5 are axially spaced to define therebetween the inner bearing chamber 7 which in the present instance mounts a spherical roller bearing 9. A lubricator ring 10 is also mounted in the inner bearing chamber 7. As illustrated the dividers 4, 5 are provided at their outer peripheral surfaces with a cylindrical section 11 having a diameter corresponding to the diameter of the housing bore 3. Additionally the dividers 4, 5 have on their outer peripheral surface a radial outwardly projecting rib or shoulder 12 which is engageable in an annular groove 13 in the bore of the housing sections 1, 2 and which fixes the dividers in place in the axial direction. In order to provide a degree of flexibility in mounting the bearing, the housing bore 3 is provided with a series of annular grooves spaced apart a predetermined axial distance from each other and in this manner the spherical roller bearing can be installed either as a loose or as a tight bearing fit in the housing bore 3. In the lower housing section 2, the dividers 4, 5 are arranged in the annular grooves 13 closely adjacent the outer ring of the bearing 9 to provide a tight bearing fit whereas in the upper housing section 1, the spherical roller bearing 9 is installed as a loose bearing and in this instance the ribs 12 of the cup-shaped dividers engage in the outer annular grooves 13a. Note that the annular grooves 13 are spaced apart a predetermined axial distance to accommodate bearings of various widths in a single housing.

The dividers also define at their inner peripheral edge a bore 17 concentric to the bearing axis having as illustrated a circumferentially extending groove to mount sealing rings or the like. The housing is also sealed relative to the ambient environment by means of annular ring members 15, 16 which are mounted on bushings 19, 20, the bushings having a series of circumferentially extending annular grooves 21 into which corresponding projections 23 of the outer boundary walls 28, 29 of the housing sections 1, 2 engage.

As illustrated the lubricator ring 10 engages the peripheral surface of the bushing 20 in the chamber section 24 of the bearing chamber. The lubricator ring projects through recesses (not shown) in the upper section of divider 4 into housing chamber 27 which communicates with the oil reservoir 6. The lubricator ring 10 is guided in an axial direction by the outer boundary surfaces of the recess in the upper section of the divider (not shown) so that it is held in the position shown and operates effectively to deliver lubricant to the bearing chamber from the oil reservoir. Thus, as shaft 22 rotates, lubricator ring 10 also rotates and in the process of rotation transports oil from reservoir 6 and chamber 27 to the inner bearing chamber 7. In order to maintain the lubricant level in the inner chamber 7 at a predetermined level for effective lubrication of the bearing and also so that the lubricating oil circulates, a spill port or hole 31 leading to the reservoir is provided in the radial wall 5a of the cup-shaped divider 5 to allow for lubricant overflow. The outer ring of the bearing 9 is also provided with a number of radial ports which connect by means of an annular groove 30 in the outer ring of the bearing or in the bore of the housing sections 1, 2 via a connecting port 32 to the oil reservoir 6, 8 and thereby further serving as lubricant overflow routes during high-speed operation of the bearing.

In accordance with another feature of the present invention, the dividers 4, 5 are provided with radially directed skirt-like extensions 25 and 25a in the lower housing section 2 which, as illustrated, have a downward extension closely adjacent the floor or bottom 26 of the oil reservoir and which in turn divides the oil reservoir into the lubricant chambers 6 and on one side of the bearing chamber and lubricant chambers 8 and 27a on the opposite side of the bearing chamber. The skirt-like extensions 25 and 25a serve to calm the lubricant in the reservoir and also functions to prevent the lubricator ring 10 from tipping.

Even though a particular embodiment of the invention has been illustrated and described herein, changes and modifications may be made therein within the scope of the following claims. For example, the seal between the divider and shaft or bushings may be designed as gap seals.

SUMMARY OF THE INVENTION

In a two-part housing 1, 2 with thrown oil lubrication, which has an outer chamber 6, 8 representing the oil reservoir and an inner chamber 7 to hold a roller bearing 9, the two chambers 6, 8 and 7 being separated by a partition extending essentially in the radial direction with respect to the bearing axis, a lubricator ring 10 is provided, which rests in the inner chamber 7 on a shaft 22 or the like and projects through recesses in the housing 1, 2 or the like into the oil reservoir 6, 27 and transports oil as the shaft rotates from the reservoir 6, 27 into the inner chamber 7.

In order to create a housing which can be easily cast and fabricated, which can be used either as a tight or as a loose bearing design, and into which bearings 9 of a variety of widths and diameters can be used, the partition consists of a separate divider 4, 5 which can be fixed axially in various positions in the housing bore 3 in a form-locking manner.

What is claimed is:

1. A bearing housing for the horizontal support of a shaft with oil ring lubrication divided in the axial direction, means defining an outer chamber in the bearing housing containing an oil reservoir and an inner chamber for a roller bearing partitions extending essentially in the radial direction with respect to the bearing axis separating the chambers, each of said partitions including a part which is removably attached to the bearing housing and is centered in a bore in the bearing housing coaxial to the support of the shaft, an oil lubricator ring resting on the shaft in the inner chamber or on a part revolving with the shaft and projecting through recesses in one of the partitions into the oil reservoir, said lubricator ring transporting oil out of the oil reservoir into the inner chamber as the shaft turns, at least one of said partitions (4, 5) having in the lower area a skirt-like extension (25), which extends down toward the floor (26) of the oil reservoir (6) to form a narrow gap and divides the oil reservoir into two axially sequential chambers (6, 27), said partitions (4, 5) being axially adjustable in the bore (3) of the bearing housing (1, 2) to accommodate various sized race rings.

2. A bearing housing according to claim 1, characterized in that two or more ring-shaped grooves (13) are provided a certain distance away from each other in the bore (3) of the bearing housing (1, 2) axially adjacent to the bearing (9) to provide for the form-locking installation of the partitions (4, 5) in the bore (3) of the bearing housing (1, 2).

3. A bearing housing according to claim 2, characterized in that the partitions (4, 5) are provided with a radially outward-directed shoulder (12), which engages with one of the ring-shaped grooves (13) in the bore (3) of the bearing housing (1, 2).

4. A bearing housing according to claim 1, characterized in that the partitions (4, 5) have a bore (17) extending concentrically to the bearing axis with a circumferentially groove (18), in which one or more sealing rings with radial play are installed, which rest on the shaft (22) or on the part revolving with the shaft (19, 20).

5. A housing according to claim 1, wherein each of said partitions (4, 5) is designed in the shape of a cup and has a cylindrical section (11) on its lateral surface.

6. A housing according to claim 1, wherein each partition (4, 5) is provided on its lateral surface with a radially outwardly directed rib (12), which engages in an annular groove (13) in the bore (3) of the housing (1, 2).

7. A housing according to claim 6, characterized in that in the housing bore (3) there are two or more annular grooves (13) at a certain distance from each other axially adjacent in each case to the bearing (9).

8. A housing according to claim 1, wherein each partition (4, 5) has a bore (17) concentric to the bearing axis with a circumferential groove (18), in which one or more sealing rings are provided with radial clearance, which rest on a shaft member mounted in the housing.

9. A housing according to claim 1, characterized in that the partition provided on the side of the roller bearing (9) which is opposite the lubricator ring (10), (5) forming jointly with an outer boundary wall (29) of housing (1, 2) an external chamber (8), corresponding essentially to the outer chamber (6) on the other side of the roller bearing (9), these two chambers (6, 8) being connected to each other by air channels (14).

10. A housing according to claim 9, characterized in that the partition (5) opposite the lubricator ring (10) is connected by ports (31) to the oil reservoir (8).

11. A housing according to claim 1, wherein the chamber between the bearing rings of bearing (9) is connected to the oil supply chamber (6, 8) by means of a circumferential groove (30) and a hole (32).

* * * * *